Patented June 30, 1936

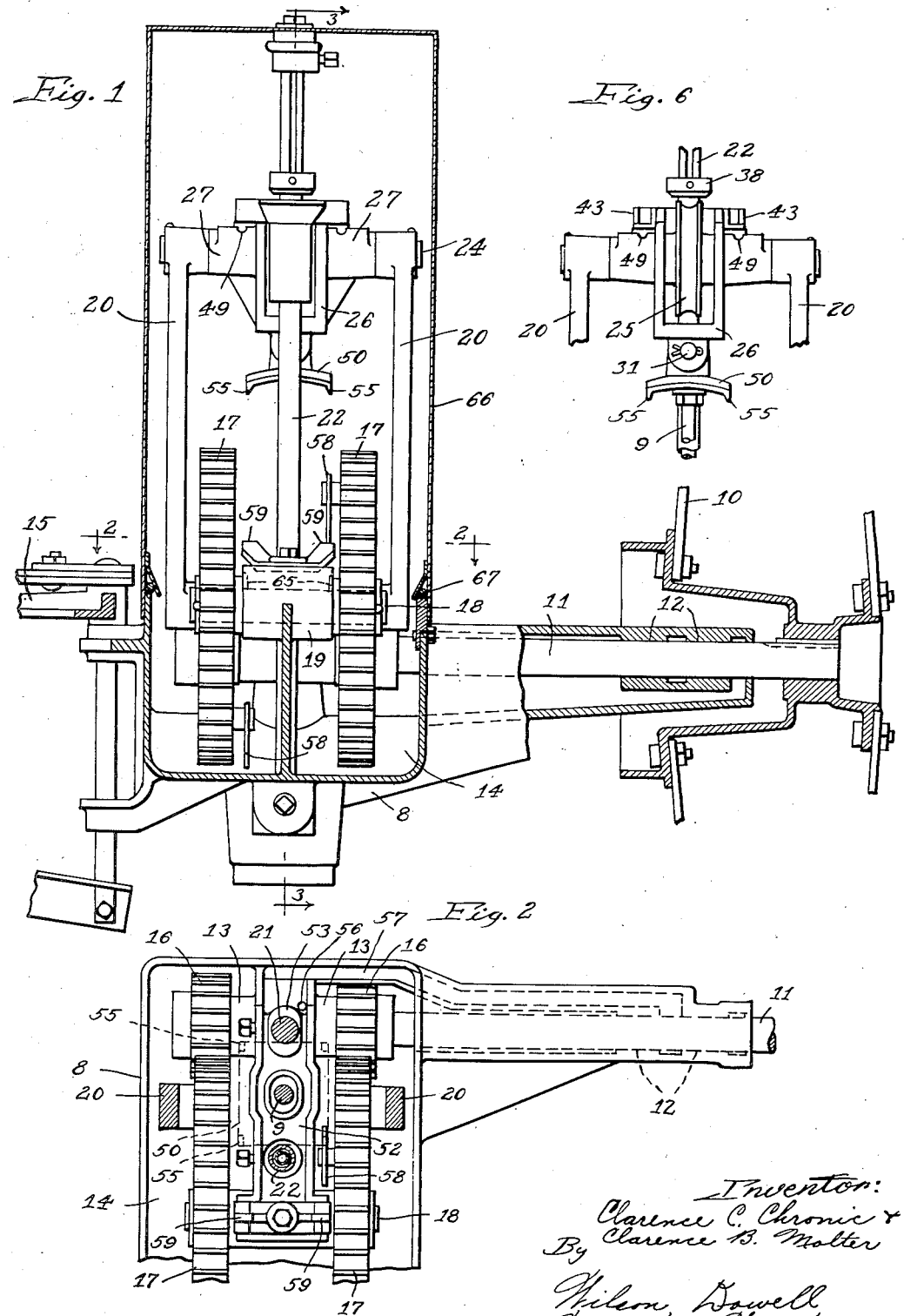

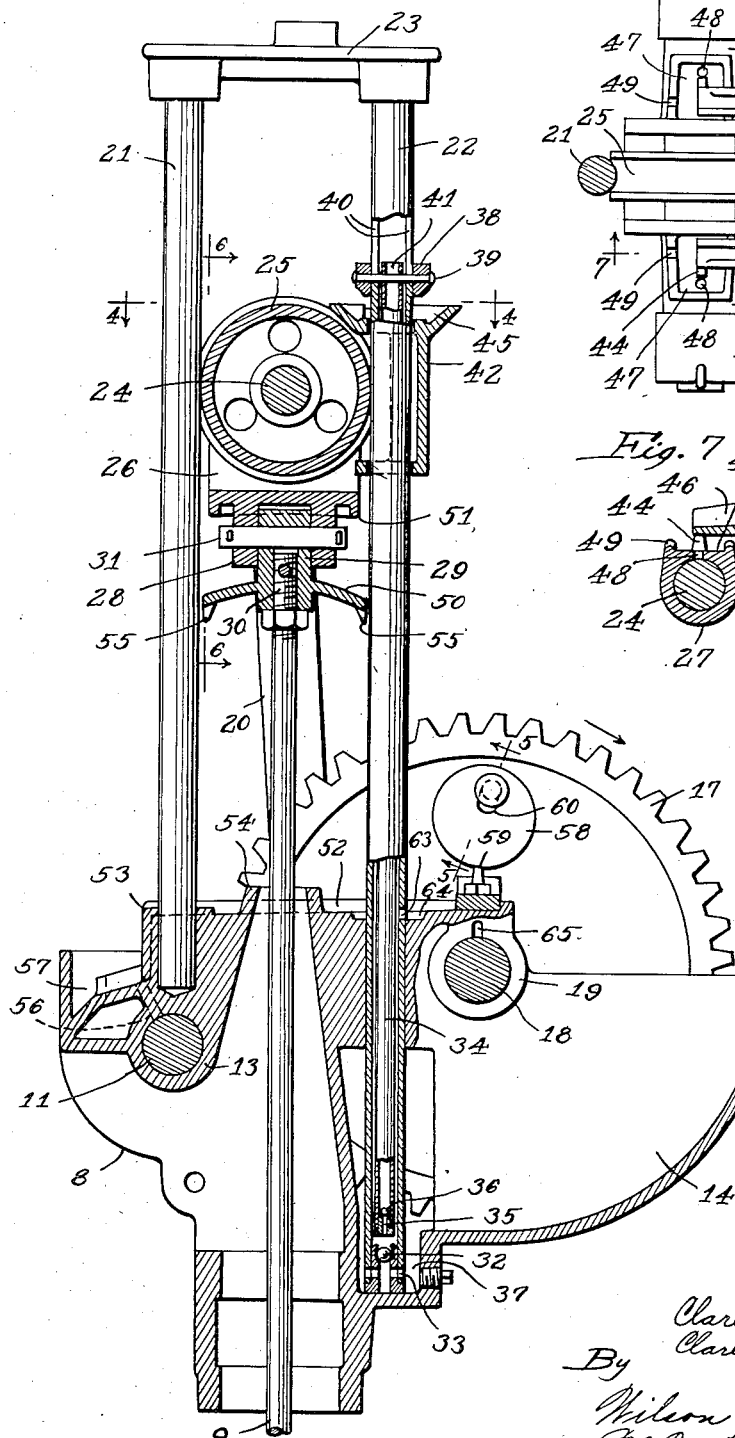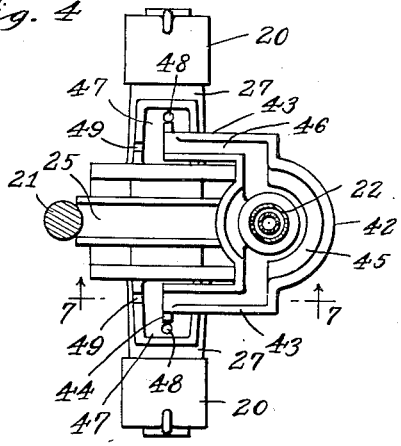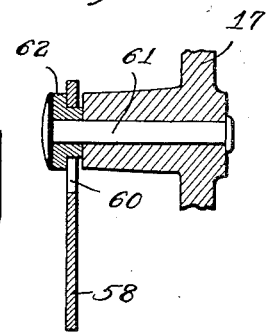

2,046,059

UNITED STATES PATENT OFFICE 2,046,059

WINDMILL

Clarence C. Chronic and Clarence B. Molter, Freeport, Ill., assignors to Stover Manufacturing & Engine Co., Freeport, Ill., a corporation of Illinois Application December 19, 1934, Serial No. 758,166

18 Claims. (Cl. 184—4)

This invention relates to windmills, and the primary object is to provide a new and improved windmill having the least amount of friction and wear and having automatic lubrication of the working parts of a kind more positive in operation and less liable to failure than prior constructions.

Our invention contemplates certain improvements whereby the main bearings of the windmill will be lubricated a maximum number of hours even though the main oil pumping system should fail or the operator should neglect to replenish the supply when it is low.

One of the features of our invention is that the automatic lubricating system starts to function as soon as the mill is placed in operation and continues until the mill is stopped. There is a constant and positive supply of oil flooding every movable part at all times, and the oil after being delivered to the desired parts returns to the reservoir to be recirculated. According to our invention, we employ a primary lubricating system including a force pump operating in a novel manner to deliver oil to a crosshead distributor for lubrication of the crosshead bearings, together with an auxiliary lubricating system which operates to automatically prime the main pump and thereby insure positive operation of this pump each time the windmill is started. This auxiliary lubricating system also functions independently of the primary system and carries on lubrication of the main bearings so long as there is an oil supply and even though the primary system should fail by its valve mechanism being rendered inoperative for causes beyond control or the usual care given to machinery of this type.

Our invention also aims to provide an improved crosshead construction in which the parts are arranged so that there is no unbalance in the operation of the pump rod and said pump rod is free from all bending or lateral strains; to provide an improved pump lifter and oil spreader for the pump which supplies oil for crosshead lubrication; to provide improved means for preventing loss of the lubricant from draining down the pump rod or from being splashed onto the pump rod and thereby carried out of the mill head; to provide improved means for priming the main pump; to provide for lubrication by means of improved dipping elements; and to provide a generally improved and more durable windmill structure.

Other objects and attendant advantages will be appreciated by those skilled in this art as the invention becomes better understood by reference to the following description when considered in connection with the following drawings, in which—

Figure 1 is a vertical section through a windmill head embodying our invention, with a fragmentary showing of adjoining parts;

Fig. 2 is a plan section taken substantially on the section line 2—2 of Figure 1;

Fig. 3 is an enlarged section taken substantially on the section line 3—3 of Figure 1;

Figs. 4, 5, and 6 are detail sections taken substantially on the section lines 4—4, 5—5 and 6—6 respectively, of Fig. 3, and Fig. 7 is a detail section taken on the section line 7—7 of Fig. 4.

Since our invention deals primarily with the construction and operation of the power operated means for reciprocating the pump rod and also the means for lubricating the working parts, we have in the present drawings shown only those parts necessary for an understanding of these improvements. The improvements are embodied in the mill head which has a main frame in the form of a casting designated generally by 8. The mill head is usually supported by means of a suitable tower with capacity to swivel about a vertical axis coaxial with the pump rod 9 for directional positioning of the wind wheel with respect to the wind. The wind wheel 10 is mounted on the front end of a shaft 11 which is journaled in front bearings 12 in a forward extension of the mill head casting and a rear bearing 13 located in that portion of the casting which provides an oil reservoir 14. On the rear end of the head is mounted the usual vane support 15. The wind wheel shaft 11 has fixed thereto a pair of spur gears 16 which mesh with gears 17 mounted on a shaft 18 which is supported in a suitable bearing 19 on the mill head casting. These gears constitute crank arms each operating a pitman 20 connected to a crosshead for reciprocating the pump rod.

One of the features of our invention is the improved construction of the crosshead and its mounting in connection with the pump rod together with improved means for lubrication with the view to keeping the pump rod free from all bending strains such as might impair the connection with the crosshead and with the further view to preventing any unbalance in the operation of the crosshead. This improved construction reduces friction and wear to a minimum and promotes long life of the working parts. In the form shown in Fig. 3 we employ a pair of vertical guides 21 and 22 fixed in the mill head casting and tied together at the top by a cross bracket 23. The crosshead comprises a horizontal shaft or pin 24 located between the guides and carrying a roller 25 adapted to roll on the guides during reciprocation of the crosshead. A crosshead frame 26 in the general form of a yoke straddles the roller 25 and has bearings 27 providing support for the shaft 24 at each side of the roller. Said shaft 24 extends beyond the ends of the bearings 27 and a pitman 20 is connected to each extended end. The bottom of the frame 26 is bifurcated at 28 to receive the end 29 of a coupling member in which the upper end 30 of the pump rod is threaded and locked by suitable means, such as a key and a lock nut. A pivot pin 31 connects the coupling parts 28 and 29 on a horizontal axis at right angles to that of the crosshead shaft. This construction provides in effect a universal connection between the crosshead and the pump rod which eliminates any lateral bending strains or lateral forces which might otherwise be brought to bear on the pump rod and thereby impair the connection of the pump rod with the crosshead or impose undue friction against the guides.

As above mentioned, our invention contemplates primary and auxiliary lubricating systems normally operating in conjunction. The primary system includes a force pump operated by power of the wind wheel for raising oil from the reservoir and discharging it at an elevated point from whence it gravitates to certain bearings and overflows to other bearings for lubrication thereof. Because of the dangerous location of a mill head, it is desired to provide automatic lubrication over as long a period as possible without replenishing the oil supply; consequently, we must deal with such factors as providing positive and dependable distribution of oil by means of simple, inexpensive and practical structures, and also providing means for effectively preserving the oil supply against leakage and loss. We have found from experience that regardless of carefully prepared instructions in respect to the inspection, operation and maintenance of the mill head and its lubricating system given to operators at the time of selling or installing windmills, there is a generol tendency to disregard, overlook or neglect inspections or care of these mechanisms. The present invention is intended to provide structures which will serve the purposes intended and will be as near fool-proof as possible considering the cost and nature of the mechanism. The primary pumping system, therefore, provides a force lubrication supply for most of the working bearings, but in order to guard against the tendency of this system becoming disabled by failure of the pump, we have provided an auxiliary lubrication system which automatically primes the pump as soon as the wind wheel starts to rotate and continues this priming function during operation. This auxiliary system also functions independently of the primary system to provide lubrication for certain of the main working bearings, at least the most critical bearings, in the event that the force pump fails by reason of its valve mechanism being rendered inoperative by foreign matter becoming lodged between the valve and its seat or by the pump becoming air bound. In any such case of failure of the main pump, the auxiliary system continues to supply oil to certain of the bearings so long as there is oil in the reservoir. Any suitable force pump may be used and in the preferred embodiment we employ a lift pump arranged within the guide 22. Here, the tubular guide is equipped at its lower end with an inwardly opening ball check valve 32, an oil intake opening 33, and a pump plunger 34, the latter having an oil intake opening 35 in its lower end and an outwardly seating ball check valve 36 for said opening. The bottom of the reservoir is constricted to provide a small sump 37 for supplying oil to the force pump even though the oil in the main reservoir is low or exhausted. Improved means is provided for operating the pump plunger, consisting of a combined plunger operator and oil spreader in the form of an annular collar 38 slidable freely on the guide 22 and having a diametrical pin 39 passing through corresponding slots 40 in the guide and connected to the upper end of the plunger which is open at 41 for discharge of oil. We have also provided improved means operated from the crosshead for lifting the pump plunger comprising what might be termed a combined pump lifter and oil distributor designated generally at 42 also slidable freely on the tubular guide 22. On the upstroke of the crosshead the distributor 42 is raised and at a given point in such stroke it strikes the underside of the plunger operator 38 and lifts the plunger, the hollow interior of which we will assume is filled with oil. On the downstroke of the crosshead the plunger is allowed to gravitate under its own weight and the added weight of the operator 38 in an oil discharging stroke in which the oil flows out through the slots 40 and is spread by the annular part 38 for delivery into the distributor trough 45 while the parts 38 and 40 are in close operative relationship. Downward movement of the plunger operator 38 is stopped when the pin 39 strikes the lower ends of the slots 40 at which time the oil has been discharged from the plunger and the distributor 42 carrying a substantial quantity of oil continues in its downward stroke in cooperative association with the crosshead. This operation of the plunger promotes a smooth and controlled discharge of oil to the distributor and eliminates any tendency of throwing the oil outwardly beyond the distributing means. There is such a tendency if the plunger is moved in the downstroke under the influence of spring pressure, particularly when operating at high speeds or when the viscosity of the oil is low due to heat or the nature of the oil. As best shown in Figs. 4, 6, and 7, the part 42 has a pair of laterally extending arms 43 overreaching the bearings 27 and resting on lugs 44, thereby supporting the part 42 from the crosshead coincident with a vertical plane passing through the longitudinal axis thereof. The part 42 is cupped to provide an oil receiving trough 45 having channels 46 in its arms adapted to deliver oil into troughs 47 on the top of the crosshead bearings. Oil from these troughs 47 pass through ports 48 to the crosshead bearings and the overflow passes through notches 49 and drains down the sides of the crosshead frame. Some of the oil received in the trough 45 from the force pump drains down the guide 22 and is picked up by the roller 25 and carried over to the guide 21, thus lubricating the guide bearing surfaces. Overflow oil draining down the sides of the crosshead will lubricate the pivotal coupling connection between the crosshead and the pump rod and some of this oil will drain onto a drip collector 50 preferably formed integral with the coupling part 29. Some of said overflow oil will also drip from the edge 51 onto said drip collector 50. Oil draining down the guides will flow into a trough 52 which has an overflow lip 53 at one end. A wall 54 around the pump rod keeps oil in the trough from flowing onto the rod. It will be here noted that the drip collector 50 is constructed and arranged so that oil dripping from the collector will fall outside of the area of the trough 52 and into the main reservoir, the oil level of which is substantially below said trough. As shown in Figs. 2 and 3, the oil collector 50 is rectangular in form and has a drip point 55 at each corner. It will be manifest that the oil collector prevents oil from draining onto the pump rod and also eliminates the possibility of any dripping oil from splashing onto the pump rod. Oil overflowing at 53 drains into a port 56 leading to the rear bearing 13 and also drains into a channel 57 leading to the front bearings 12. These main bearings for the wind wheel shaft are therefore lubricated by oil from the trough 52 supplied by the force pump.

Oil is also supplied to the trough 52 by the auxiliary lubrication system, above mentioned. This system preferably includes means operated by power of the wind wheel for successively dipping into the reservoir and depositing small quantities of oil into the trough 52. Our invention provides improved means for this purpose consisting of one or more dipping elements 58 carried on one or both of the gears 17 and arranged to be dipped into and out of the oil in the reservoir by rotation of the gears. These elements are so constructed as to be dragged over wiping elements 59, thereby removing the oil from said dipping elements. This oil drains from said wiping elements into the trough 52. The dipping elements 58 are so constructed that they will not bind or jam against the wiping elements 59 when the gears are rotated in the reverse direction. In the preferred embodiment, the dipping elements are in the form of disks, each having an elongated slot 60 in off-center relation. Each disk is supported to swing freely on a pin 61 mounted on the gear and passing through the slot 60, a suitable bearing head 62 being interposed between the pin and the disk. It will be evident that as each disk is carried through its upper cycle it will be dragged over the wiping element 59 and oil adhering to the disk will be positively wiped off, insuring a supply of oil in the trough 52. Should the wind wheel rotate in the opposite direction, the disk elements will be free to ride over the fixed wiping elements 59 by reason of the lost motion afforded by the slots 60.

It should be here noted that oil supplied to the trough 52 is utilized for priming the main pump. As shown in Fig. 3, a port 63 in the tubular guide 22 provides oil communication between the trough 52 and the plunger chamber formed by the tubular guide, the port 63 being located at the bottom of a well 64 to facilitate supply of priming oil. It will be apparent that upon starting the windmill in operation the dipping elements of the auxiliary system will supply oil to the priming port 63 and thereby prime the main pump. This automatic priming insures against failure of the main pump. For example, it has been found in practice that operators not infrequently fail to prime the pumping mechanism when setting up a pump or when replenishing the oil supply and, as a consequence, the valve mechanism may become air bound and fail to function. Our invention overcomes the troubles incident to negligence and oversight of this kind. Furthermore, if the valve mechanism of the main pump should be rendered inoperative in spite of the ordinary care given to mechanisms of this kind, the auxiliary system will supply oil to all of the bearings except the crosshead bearings; in other words, the main working bearings will be kept lubricated so long as there is oil in the reservoir. The mill head will function for a long period in this condition with the least liability of damage to bearings and working parts.

The bearing 19 may be lubricated by oil from the trough 52, but because of its location and the continuous supply of oil draining on the sides of the gears 17, we have provided oil ducts 65 in the ends of the bearing, as shown in Figs. 1 and 3, adapted to conduct such oil to this bearing.

A suitable hood 66 encloses the operating parts of the mill head, and suitable means is provided for effecting a sealed connection at 67 between the hood and the top of the mill head casting. The operating parts of the mill head are thus effectively protected against the elements and the oil supply is guarded against admission of water and other foreign matter.

Changes may be made in the construction and arrangement of parts within the scope of our invention defined in the appended claims, in which—

We claim:

1. In a windmill, the combination in the mill head, of a pair of guides, a crosshead having a roller interposed between and adapted to reciprocate on the guides, a pump rod attached to the crosshead, mechanism operated by the wind wheel connected to each end of the crosshead for reciprocating the latter, an oil reservoir, means operated by power of the wind wheel for pumping oil from said reservoir to a discharge point above the crosshead, an oil distributor structurally independent of the crosshead mounted for free sliding movement on one of the guides and arranged for receiving oil from said discharge and distributing it to the crosshead bearings, and means supporting said distributor in cooperative relation with the crosshead.

2. In a windmill, the combination in the mill head having an oil reservoir, of a pair of vertical guides, a horizontal crosshead shaft located between the guides, a roller on said shaft cooperating with said guides, a crosshead frame having a bearing for said shaft at each side of the roller, mechanism for reciprocating the crosshead including pitmans connected to the ends of the crosshead shaft, a pump rod connected to the lower end of the crosshead frame, an oil distributor freely slidable on one of said guides and having an oil distributing channel leading to each crosshead bearing, each such channel being formed in an arm extending from said distributor, and each said arm having supporting contact at its outer end with the crosshead approximately at the vertical longitudinal plane thereof.

3. In a windmill, the combination in the mill head, of a pair of vertical guides, a horizontal crosshead shaft located between said guides, a roller on said shaft cooperating with the guides, a crosshead providing bearing support for said shaft at each side of the roller, said shaft projecting beyond the outer end of each bearing, means attached to each shaft and for imparting vertical reciprocation to the crosshead, a pump rod attached to the under side of the crosshead coplanar with a vertical plane passing through the axis of rotation of the roller, an oil distributor mounted to slide freely on one of the guides and supported in operative relation to the crosshead from a point of support approximately coplanar with said vertical plane, whereby said pump rod is kept free from any bending or lateral strains as a consequence of the support of said distributor, said distributor being arranged to distribute oil to said crosshead bearings, and means for supplying oil to said distributor.

4. In a windmill, the combination in the mill head, of a pair of vertical guides, a horizontal crosshead shaft located between said guides, a roller on said shaft cooperating with said guides, a crosshead having a bearing for said shaft at each side of said roller, means operated by the wind wheel and connected to said shaft for reciprocating the crosshead, a pump rod, means connecting the pump rod to the under side of the crosshead on a horizontal axis at right angles to that of the crosshead shaft, an oil reservoir, an oil distributor associated with the crosshead and arranged for distributing oil to the crosshead bearings, means for lifting oil from the reservoir to said distributor, and means whereby oil delivered to said distributor serves to lubricate one of the guides, the roller serving to carry oil from said lubricated guide for lubricating the other guide.

5. In a windmill, the combination of a mill head having an oil reservoir, crosshead guide means, a crosshead reciprocating thereon adapted to operate a pump rod, said guide means including a tubular guide having a pump plunger therein, the inlet end of the pump being located in said reservoir and said plunger extending to a point above the crosshead and adapted to discharge oil from its upper end, a combined plunger operator and oil spreader comprising a collar weight slidable on said tubular guide and supported on the plunger, and means whereby the crosshead in its upper stroke is caused to lift said collar and the plunger in an oil lifting stroke, the plunger being allowed to gravitate independently of the crosshead during the downstroke of the latter whereby oil is discharged from the upper end of the plunger under the influence of the weight of said collar and the plunger for lubricating the crosshead.

6. In a windmill, the combination of a mill head having an oil reservoir, crosshead guide means, a crosshead reciprocating thereon adapted to operate a pump rod, said guide means including a tubular guide having a pump plunger therein, the inlet end of the pump being located in said reservoir and said plunger extending to a point above the crosshead and adapted to discharge oil from its upper end, a combined plunger operator and oil spreader comprising a collar weight slidable on said tubular guide and having a diametrical pin extending through corresponding slots in the tubular guide and fastened to the plunger, and an oil distributor actuated by the crosshead for lifting said collar and the plunger in an oil lifting stroke and allowing the collar and plunger to gravitate independently when said distributor is lowered, whereby oil is delivered from the upper end of the plunger under the influence of the weight of said collar and the plunger, and whereby the collar serves to spread the discharging oil so that it flows in controlled streams onto said distributor, said distributor serving to distribute oil to the crosshead bearings.

7. In a windmill, the combination in the mill head having an oil reservoir, crosshead guide means, a crosshead adapted to be reciprocated on said guides, a pump rod attached to the crosshead, mechanism operated by the wind wheel for reciprocating the crosshead, said guide means including a tubular guide having an oil pump therein including a plunger extending upwardly to a point above the crosshead, a combined plunger operator and oil spreader freely slidable on said tubular guide and attached to the upper end of said plunger, an oil distributor slidable on said tubular guide beneath said plunger operator and cooperating with the crosshead so as to be raised on the upward stroke of the latter, the distributor serving to contact said pump operator during the upward stroke for moving the plunger in an oil lifting stroke, said plunger operator having a weight functioning to actuate the plunger in the downstroke, and the distributor being shaped to receive oil overflowing the spreader during the downstroke of the plunger and being further shaped to distribute oil to the crosshead bearings.

8. In a windmill, the combination in the mill head having an oil reservoir, crosshead guide means, a crosshead reciprocating thereon adapted to operate a pump rod, mechanism operated by the wind wheel for reciprocating the crosshead including operating parts journaled in the mill head, a main pump for pumping oil from said reservoir to an upper point for lubricating the crosshead, and means for continually priming said pump while the mill is in operation including oil dipping elements on one of said operating parts adapted to be dipped in succession into the oil reservoir and to subsequently deposit said oil for delivery in part to said priming means.

9. In a windmill, the combination in the mill head having an oil reservoir, of a pair of vertical guides one of which is tubular, an oil pump including a plunger in the tubular guide, a crosshead connected to a pump rod and adapted to be reciprocated on the guides, mechanism operated by the wind wheel for reciprocating the crosshead including one or more gears partly immersed in the oil, means for operating said plunger from power of the wind wheel to pump oil to the crosshead for lubrication thereof, and means for automatically priming said pumping means by oil raised from the reservoir by the rotating gear or gears.

10. A structure as set forth in claim 9 in which the last named means includes one or more dipping elements mounted on the gear or gears so as to be carried into the oil in the reservoir, and means arranged to be wiped by said dipping elements during a portion of their travel above the reservoir to supply oil to said pump priming means.

11. In a windmill, a primary and an auxiliary lubricating system for lubricating working parts of the mill head comprising an oil reservoir, a main oil pump operated by power of the wind wheel for lifting oil from said reservoir to an overhead discharge, means for distributing oil from said discharge to lubricate working parts of the mill head, and auxiliary lubricating means for automatically priming said main pump whenever the wind wheel rotates, said auxiliary lubricating means including dipping elements arranged to successively dip into the reservoir and raise oil to a priming channel leading to said pump.

12. In a windmill, a primary and an auxiliary lubricating system for lubricating working parts of the mill head including the crosshead bearings comprising an oil reservoir, a main oil pump operated by power of the wind wheel for lifting oil from said reservoir to an overhead discharge, means for distributing oil from said discharge and allowing it to flow by gravity for lubricating the crosshead bearings and certain main working bearings at a lower level, and auxiliary lubricating means operated by power of the wind wheel for raising oil from said reservoir and discharging it for delivery to certain of said main bearings and to said main pump for priming the latter.

13. In a windmill, a primary and an auxiliary lubricating system for lubricating working parts of the mill head including the crosshead bearings and crosshead operating gears comprising an oil reservoir, a main oil pump for pumping oil from said reservoir to an overhead point, means for distributing the oil from said overhead point by gravity flow to the crosshead bearings, and auxiliary lubricating means consisting of elements carried by one or more of the crosshead operating gears and arranged to dip into the oil in the reservoir and subsequently deposit certain of said oil into a trough for distribution to bearings for the wind wheel shaft and also for delivery to said main pump for the purpose of priming the same.

14. A mill head of the character described, having an oil reservoir, mechanism for reciprocating a pump rod including shafts and gearing journaled in the head with one or more of the gears partly immersed in the oil, and means for distributing oil from said reservoir to certain of said bearings including one or more disks, each disk having a slot located off-center and being mounted on one of said gears by means of a pin passing through such slot, and a wiper lug arranged so that said disks will be carried in succession in contact therewith for wiping oil therefrom for distributing to said bearings, and said slots being arranged to prevent the respective disks from binding against said wiper lug in the event of rotation of said gears in opposite directions.

15. In a windmill, the combination in the mill head having an oil reservoir, crosshead guide means, a crosshead reciprocating thereon adapted to operate the pump rod, an oil pump supplied with oil from the reservoir and adapted to discharge oil on top of the crosshead for lubrication of the cross head bearings, a wind wheel shaft received in a bearing in the mill head, a gear shaft also received in a bearing therein, gears providing a connection between the two shafts, means providing an operating connection between the gears and the crosshead for operating the latter, a trough having communication with the bearings of said shafts to provide for their lubrication, said trough being located below the operating range of the crosshead, means whereby oil supplied to said crosshead overflows and is supplied to said trough, and a drip collector arranged between the crosshead and the pump rod to intercept oil dripping in the area around the pump rod and arranged to cause said oil to drip from one or more points outside of the area of said trough whereby to prevent dripping and splashing of oil onto the pump rod.

16. In a windmill, the combination in the mill head, comprising a pair of vertical guides, a crosshead connected to a pump rod and adapted for reciprocation on the guides, an oil reservoir in the bottom portion of the mill head, mechanism operated by the wind wheel for reciprocating the crosshead including operating parts journaled in the mill head, means actuated by power from the wind wheel for lifting oil from the reservoir to a discharge above the crosshead, means for distributing said discharged oil to the crosshead bearings and allowing the oil to overflow, a trough beneath the crosshead adapted to receive overflow oil which flows down the guides, said trough serving to distribute oil to certain bearings of said mechanism, and a drip collector located above said trough and beneath the crosshead and arranged to reciprocate with the latter, said drip collector being constructed to intercept oil dripping from the crosshead and to prevent said oil from reaching the pump rod and being further constructed to cause said oil to drip outside of said oil trough for draining into the reservoir, whereby to prevent splashing of oil onto the pump rod as a consequence of dripping from the crosshead.

17. A structure as set forth in claim 16 in which said drip collector is part of a coupling connecting the pump rod to the crosshead.

18. A structure as set forth in claim 16, in which said drip collector is part of a coupling having threaded connection to the upper end of the pump rod and a pivotal connection to the lower end of the crosshead.

CLARENCE C. CHRONIC.
CLARENCE B. MOLTER.